United States Patent [19]

Brown et al.

[11] Patent Number: 4,547,535
[45] Date of Patent: * Oct. 15, 1985

[54] AQUEOUS COATING COMPOSITION COMPRISING SELF-EMULSIFIABLE ESTER OF EPOXY AND ACID CONTAINING ADDITION POLYMER

[75] Inventors: George L. Brown, Scotch Plains; Arthur T. Spencer, New Providence, both of N.J.

[73] Assignee: SCM Corporation, New York, N.Y.

[*] Notice: The portion of the term of this patent subsequent to Apr. 10, 2001 has been disclaimed.

[21] Appl. No.: 430,158

[22] Filed: Sep. 30, 1982

Related U.S. Application Data

[63] Continuation of Ser. No. 249,795, Apr. 1, 1981, Pat. No. 4,442,246, which is a continuation of Ser. No. 95,682, Nov. 19, 1979, abandoned, which is a continuation-in-part of Ser. No. 914,472, Jun. 12, 1978, abandoned.

[51] Int. Cl.$^4$ .............................................. C08L 63/02
[52] U.S. Cl. .................................... 523/404; 523/412; 525/119; 525/530
[58] Field of Search ................ 523/404, 412; 525/119, 525/530

[56] References Cited

U.S. PATENT DOCUMENTS

| | | | |
|---|---|---|---|
| 3,943,187 | 3/1976 | Wu | 428/418 |
| 3,945,963 | 3/1976 | Levine et al. | 260/29.6 NR |
| 4,029,620 | 6/1977 | Chen | 260/29.6 NR |
| 4,126,596 | 11/1978 | Schimmel et al. | 428/463 |

Primary Examiner—Paul Lieberman
Assistant Examiner—Amelia B. Yarbrough
Attorney, Agent, or Firm—Thomas M. Schmitz

[57] ABSTRACT

Non-gelled compositions containing hydroxy ester copolymer having carboxyl groups and substantially free of oxirane groups are disclosed which are the esterification reaction product of (A) acidic addition copolymer; and
(B) mixtures containing epoxy resin including both aromatic polyether containing oxirane groups and aromatic polyether devoid of oxirane groups, in which the mixture comprises at least 40% of the total resin solids and contains insufficient oxirane groups to react with all of the carboxyl groups in the copolymer. The resulting composition is neutralized with amine, is self-emulsifiable in water and is useful for coating, e.g., for cans.

9 Claims, No Drawings

AQUEOUS COATING COMPOSITION COMPRISING SELF-EMULSIFIABLE ESTER OF EPOXY AND ACID CONTAINING ADDITION POLYMER

CROSS-REFERENCE TO RELATED APPLICATION

This is a continuation of application Ser. No. 249,795 filed Apr. 1, 1981, now U.S. Pat. No. 4,442,246, which is a continuation of application Ser. No. 06/095,682, filed Nov. 19, 1979, now abandoned, which is a continuation-in-part of application Ser. No. 05/914,472, filed June, 12, 1978, now abandoned.

BRIEF DESCRIPTION OF THE INVENTION

This invention relates to aqueous emulsion compositions having improved stability. In particular, the compositions of this invention are mixtures, self-emulsifiable in water, comprising a non-gelled hydroxy ester copolymer containing carboxyl groups and substantially free of oxirane functionality. The hydroxyester copolymer is the esterification reaction product of an acidic addition copolymer and a mixture containing epoxy resin, which mixture includes at least 5% by weight of aromatic polyether containing oxirane functionality and at least 5% by weight of aromatic polyether devoid of oxirane functionality. The acidic addition copolymer is a solution copolymer of monoethylenically unsaturated monomers comprising at least about 20% of monoethylenically unsaturated carboxylic acid, based on the total weight of monomers. The epoxy resin mixture constitutes at least about 40% of the total resin solids content and has sufficient oxirane groups to provide a ratio of oxirane groups to carboxyl groups in the acidic copolymer of from 1:2 to 1:20. At least some of the carboxyl groups in the copolymer-epoxy resin hydroxy ester are reacted with a base to render the composition self-emulsifiable in water. The resulting compositions are useful as coatings, for example, as can coatings which are cured by baking. An aminoplast or phenoplast resin in small proportion may be added to enhance the cure on baking.

DETAILED DESCRIPTION OF THE INVENTION

Expoxy resins contain a plurality of aromatic groups joined together by either linkages, and provide excellent physical and chemical properties. It has been difficult to employ such resins in aqueous media because they lack storage stability. This is desirable and of particular importance when spray application is contemplated, especially for the interior of sanitary cans. The slightest change in the pH of the aqueous composition as a result of hydrolytic instability results in a marked change in the viscosity and application properties of the coating.

To obtain aqueous coatings of proper resin solids content and viscosity it has often been necessary in the trade to employ an emulsion system in which a water immiscible component is suspended in an aqueous continuous phase with an emulsifying agent. Such emulsion systems are intrinsically unpredicable since the particle size of the emulsion will vary with the agitation of the composition. This invention provides self-emulsifiable compositions in which the particle size of the emulsion is substantially the same regardless of whether high speed agitation is used or whether the mixture with water is barely stirred.

One factor of importance to achieve the optimum results under this invention is the chemical similarity between the aromatic ether devoid of oxirane functionality, and the aromatic polyether epoxide present in the mixture which is reacted with the acidic copolymer. This chemical similarity is believed to contribute to the achievement of a self-emulsifiable composition. As indicated above, these compositions form stable emulsions with water which have a particle size conditions of agitation or storage.

Another factor of importance in this invention is the employment of epoxy resins having an average molecular weight ($M_n$) (determined by calculation) of at least 1,500. Such high molecular weight aromatic polyethers are incompatible with carboxylfunctional addition polymers. Thus, while both materials may be soluble in the same organic solvent, the solutions do not dissolve in one another and tend to separate. While lower molecular weight epoxides yield compatible solutions, the higher molecular weight epoxides provide more desirable properties. Substantially complete esterification of the oxirane groups by the carboxyl groups in the copolymer eliminates the incompatability of the high molecular weight epoxides and, at the same time, gives the benefits of their better properties.

Still another factor of importance in achieving optimum results is the use of mixtures of monoepoxides and diepoxides. It is desired to chemically couple together with the carboxyl copolymer as much epoxide as possible. Some of this epoxide is desirably a diepoxide in order to increase the molecular weight and complexity of the final copolymer. However, the more monoepoxide, the more total aromatic polyether can be chemically combined with the carboxyl copolymer. The maximum proportion of diepoxide is subject to many variables and the only limit is the avoidance of gelation. This factor will be fined by the term "non-gelled". The high molecular weight and complexity of the copolymers formed herein lowers the proportion of curing agent needed, resulting in tougher and more impact resistant cured coatings.

A further point of considerable importance in achieving optimum results is the selection of bisphenol-terminated aromatic polyethers as the oxirane-free polyether which finds its way into the discontinuous phase of the emulsion. Bisphenol-terminated aromatic polyethers possess excellent hydrolytic stability in aqueous alkaline medium and give the best properties in the final, cured products. However, introduction of the oxirane-free polyether can be accomplished in many different ways including addition of such a component to epoxy resin or by defunctionalization of the epoxy resin in any of several ways. This invention is not limited to any manner of achieving a mixture containing epoxy and aromatic polyether devoid of oxirane groups.

Other and further features of the invention will become apparent from the following discussion of the various components which are combined herein and the manner of combining them. One main component of the final copolymer composition is an addition copolymer of monoethylenically unsaturated monomers comprising at least about 20% of monoethylenically unsaturated carboxylic acid, based on the total weight of monomers. These copolymers are themselves well known, being unusual in this invention solely because of the large amount of copolymerized carboxylic acid. The balance of the copolymer is preferably nonreactive under the contemplated conditions of polymerization, prereaction with the epoxy resin, and cure, but small amounts of other reactive monomers may be tolerated. Examples of other suitable reactive monomers are hydroxy monomers such as 2-hydroxy ethyl methacrylate, amide monomers such as acrylamide, and N-methylol monomers such as N-methylol acrylamide.

The non-reactive monomers are, for example, acrylate and methacrylate esters, such as ethyl acrylate, methyl methacrylate or isobutyl methacrylate, styrene or vinyl toluene, vinyl acetate, vinyl chloride, vinylidene chloride, acrylonitrile, and the like. Their function is to enhance solvent solubility and film formation.

The carboxyl-functional monomer in large proportion is essential. The preferred minimum proportion is 30% of the weight of monomers. Methacrylic acid provides the best hydrolytic stability and is very much preferred, but other acids are also useful, such as fumaric acid, acrylic acid, crotonic acid, itaconic acid, and the like. Up to about 80% of the monomers can be carboxyl functional, but the maximum proportion is more generally determined by retention of solvent solubility of the copolymer.

In accordance with this invention the addition copolymer is preformed and reacted with the mixture containing epoxy resin and aromatic polyether free of oxirane groups in the presence of an esterification catalyst. The mixture containing epoxy resin includes at least 5% by weight or aromatic polyether containing oxirane functionality and at least 5% by weight of aromatic polyether devoid of oxirane functionality. Preferably, the mixture containing epoxy resin which is reacted with the addition copolymer includes at least 5% by weight aromatic polyether devoid of oxirane functionality as well as at least 5% by weight or aromatic polyether containing both a component with a single oxirane group and a component with two oxirane groups. This is believed to maximize compatibility. The aromatic polyether devoid of oxirane functionality can be formed by defunctionalizing epoxy as descibed herein or can be added later. The mixture can be heated and agitated to enhance the intimacy of the association between the various components.

The addition copolymer must be made in solution so that it is non-gelled and organic solvent-soluble.

Aromatic polyethers, and particularly diglycidyl ethers are well known and available in commerce. The usual aromatic polyether backbone of the epoxy resin is based on a bisphenol which defines a pair of phenolic groups joined together through an intervening divalent hydrocarbon. The preferred bisphenols have the formula:

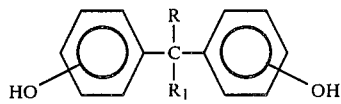

in which R and $R_1$ are hydrogen or alkyl groups containing up to 8 carbon atoms. Bisphenol A is particularly preferred, this compound having the two OH groups in the para position and R and $R_1$ are each methyl.

The epoxy resins which are used herein possess hydroxy groups in addition to epoxy groups. The higher the molecular weight of the epoxy resin the more hydroxy groups are present. In addition, when the epoxy resin is defunctionalized by reaction with a bisphenol, for example, to reduce the proportion of diepoxide, additional hydroxy groups are provided. These hydroxy groups can participate in the final curing reaction.

Among the common epoxy resins available in commerce are diglycidyl ethers made by reaction of epichlorohydrin with Bisphenol A. Typically they have a molecular weight in the range of about 350 to 6,000.

Mixtures having an average molecular weight of at least about 1,500 and containing less than 50% by weight of diglycidyl ethers are preferred for use in this invention. A simple way of providing such mixtures is by reacting a lower molecular weight diglycidyl ether with between 1 and less than 2 molar proportions of a bisphenol. It is essential that the reaction be stopped when the desired degree of defunctionalization is achieved. The reaction may be stopped by lowering temperature or adding the acidic copolymer. This increases molecular weight and provides bisphenol terminal groups. It is especially preferred to use a mixture containing from 3% to about 30% by weight of diglycidyl ethers. The molecular weight of the epoxy resins is normally obtained by calculation.

It is surprising to be able to combine the higher molecular weight epoxy resins preferred herein with preformed copolymers to provide non-gelled compatible compositions. It is also surprising to find dispersibility where the proportion of the mixture containing epoxy resin is large and contains a large proportion of a component devoid of oxirane functionality because compatibility by coreaction is limited. It is particularly surprising that compatibility and dispersibility are achieved when 25% or more of the epoxy resin is devoid of oxirane functionality.

Defunctionalization of the epoxy resin can be performed in various ways instead of by reaction with a bisphenol mentioned previously. For example, phenois other than bisphenols, i.e., monofunctional phenols, can be used. In any case, basic catalysts are normally used in reactions with phenols. Carboxylic acids such as benzoic acid or octoanoic acid, can also be used to defunctionalize the epoxy resin, basic catalysts again being appropriate. In addition, alcohols such as octanol, are suitable defunctionalizing agents. The etherification reaction with alcohol is fostered by the presence of a catalyst such as boron trifluoride.

All or part of the component which is free of oxirane groups can be provided by simply adding an appropriate preformed aromatic polyether. That is, the aromatic polyether free of oxiran groups need not be formed in an epoxy defunctionalization reaction as previously described. Similarly, the component containing a single epoxy group, the presence of which is preferred, can be added as a pre-formed component.

The esterification reaction involving the oxirane groups of the epoxy resin and carboxyl functionality of the addition copolymer is a conventional reaction which is normally carried out in the presence of a small amount of an amine esterification catalyst. An appropriate catalyst is dimethylamino ethanol, but many others are known. These catalysts are normally used in an amount of from 0.1–0.3% of the materials subjected to esterification.

The compositions of this invention form films with reasonably good properties on baking in the absence of any external curing agent. However, from 1–25% of the curing agents such as aminoplast resins, phenoplast resins and mixtures thereof will serve to enhance the cure. With analogous prior art polymers at least 15% of curing agent, based on the total weight of polymer is normally required. While such levels of curing agents are useful with the hydroxy ester copolymers of this invention, this invention is unusual in enabling the achievement of a superior cure using a smaller proportion of curing agent. For example, 2-12% is entirely sufficient to cure films containing the hydroxy ester copolymers of this invention. The advantage in using reduced amounts of curing resin is that the small proportion of curing agent needed to provide the desire solvent insolubility results in less brittleness in the cured film.

The preferred curing agents are water dispersible. These will be illustrated by hexamethoxy methyl melamine, or by A stage phenol-formaldehyde resols. However, the compositions of this invention are emulsions and water dispersability in the curing agent is not essential.

The curing of analogous compositions by baking, is entirely conventional in the art. Presumably, the methylol groups introduced by the curing agent reacts with the hydroxy and carboxyl groups present in the copolymer, and with the hydroxy present in the aromatic polyether devoid of oxirane functionality. Acidic curing agents are commonly employed to facilitate the cure, though this is not essential, especially when a phenoplast curing agent is used.

In the preferred compositions, the epoxy resin is a mixture of bisphenolic polyethers, at least 10% of which contain oxirane functionality, and at least 10% of which are devoid of oxirane functionality. At least 3% of the total bisphenolic polyethers are diglycidyl ethers. As previously indicated, these bisphenolic polyethers are of relatively high molecular weight, possessing an average molecular weight, determined by calculation, of at least 1500. The acidic copolymer which is combined with the epoxy resin is a solution copolymer of about 30-70% of methacrylic acid, the balance of the monomers being nonreactive as previously defined, said proportions being based on total resin solids. The epoxy resin mixture constitutes from 55-90% of the total resin solids content, and it provides a ratio of oxirane groups to carboxylic groups of from 1:4 to 1:10. From about 30% to about 90% of the carboxyl functionality in the polymer product is reacted with a volatile amine which may be ammonia, or other volatile amine, such as triethyl amine or, preferably, dimethylamino ethanol.

The carboxyl-functional copolymers which are preferred generally have an average molecular weight ($M_n$) in the range of 3,000 to 20,000, preferably 3,000-6,000. Molecular weight can be controlled by monomer content during polymerization or catalyst concentration, or polymerization temperature, these being known expedients for this purpose. Mercaptan chain termination is preferably avoided since sanitary can use is contemplated as mercaptans have an offensive odor.

Lastly, in the preferred use of the compositions of this invention from about 3% to about 10% of water dispersible aminoplast resin is added to the mixture to assist in cure on baking.

The resins of this invention are solids and are used by dissolution in a volatile organic solvent. A wide variety of solvents are suitable. In general any solvent which does not interfere with the achievement of an emulsion when the acidic copolymer salts are diluted with water can be used. The point at which an emulsion is achieved is easily observed. It occurs when the aqueous system changes from clear to milky.

Organic solvents of limited water miscibility, such as xylene, toluene, and butanol are useful, and they may be used alone or together with water miscible solvents, such as 2-ethoxy ethanol or methyl ethyl ketone.

The aqueous coating compositions of this invention are primarily useful for coating aluminum, tinplated steel, pretreated metals, steel, or metals coated with the same or different resin composition, i.e., a second coat. These aqueous compositions also can be used for coating other substrates, such as wood. The most preferred and advantageous use of the coating compositions is for the interior coating of metal containers by spraying, using enough amine for salt formation with from 50% to 90% of the available carboxyl groups, and enough water to provide a final solids content of about 15% to about 40%. After application the coating is baked for about 5 seconds to about 30 minutes at between about 250° F. and about 600° F. A typical bake is for about 2 minutes at about 400° F.

The invention is illustrated in the following nonlimiting examples. Proportions are by weight.

EXAMPLE 1

An acrylic polymer solution is prepared as follows:

|  | Parts by weight |
| --- | --- |
| Ethylene glycol monobutyl ether | 451.7 gms |
| Ethylene glycol monohexyl ether | 47.6 gms |
| n-butanol | 451.7 gms |
| Isopropanol | 349.0 gms |
| Methacrylic acid monomer | 1045.0 gms |
| Styrene monomer | 1045.0 gms |
| Ethyl acrylate monomer | 110.0 gms |
| Benzoyl peroxide (70% in water) | 220.0 gms |
| Benzoyl peroxide (70% in water) | 20.0 gms |
| TOTAL | 3470.0 gms |

Ethylene glycol monobutyl ether, ethylene glycolmonohexyl ether, n-butanol and isopropanol are charged to a reaction vessel equipped with a stirrer, reflux condenser, Dean Stark trap, thermometer, addition funnel and nitrogen inlet. The methacrylic acid monomer, styrene monomer, ethyl acrylate monomer and 220 gms benzoyl peroxide are premixed in a mixing vessel. 460 gms of this premix are added to the reactor, the remaining 1960 gms are placed into the addition funnel. The nitrogen flow is started and the batch is heated to 90° C. The remaining 1960 gms of premix is added over three hours. The batch is held for an additional one hour at 90° C. 20 gms benzoyl peroxide is added and the batch is held at 90° C. for two hours. The batch is cooled to room temperature. The resulting acrylic polymer solution has a solid content of 63.4%. The acrylic polymer has the composition methacrylic acid/styrene/ethyl acrylate 47.5/47.5/5 by weight and an acid number of 279.7.

A partially defunctionalized epoxy resin is prepared as follows:

|  | Parts by weight |
| --- | --- |
| Epon 829 liquid epoxy resin | 4634.0 gms |
| Bisphenol A | 2366.0 gms |
| Methyl isobutyl ketone | 524.0 gms |
| Benzoic acid | 183.0 gms |

| | Parts by weight |
|---|---|
| Tributylamine | 13.0 gms |
| Ethylene glycol monobutyl ether | 1425.0 gms |
| Ethylene glycol monohexyl ether | 150.0 gms |
| n-butanol | 1425.0 gms |
| TOTAL | 10720.0 gms |

Epon 829 (a precatalyzed liquid epoxy resin), Bisphenol A and methyl-isobutyl ketone are charged to a reaction vessel equipped with heating mantle, stirrer, reflux condenser, Dean Stark trap, thermometer and nitrogen inlet. Epon 829 liquid epoxy resin is a product of Shell Chemical Company and is characterized by a viscosity of 30–70 poises, 193–203 epoxide equivalent weight and 3 maximum Gardner color. The nitrogen flow is started and the batch is heated to 140° C. The batch exotherms to 201.5° C. The 524 gms methylisobutyl ketone is removed via the Dean Stark trap. The batch is cooled to 171° C. and held for one hour. The oxirane value is measured and is found to be 0.52 meq/gm. The batch is cooled to 150° C. and the benzoic acid and tributylamine are added. The batch is held for one hour and the oxirane and acid content are measured. The acid number is 0 and the oxirane level is 0.27 meq/gm. Ethylene glycol monobutyl ether and ethylene glycol monohexyl ether are added. When uniform, the batch is cooled to 110° C. and n-butanol is added. The batch is cooled to room temperature. The resulting epoxy resin solution has a solids content of 67%. The epoxy resin has a number average molecular weight in excess of 1500, an acid number of 0 and an oxirane level of 0.27 meq/gm.

The epoxy acrylate polymer solution is prepared as follows:

| | Parts by weight |
|---|---|
| Acrylic polymer solution (prepared above) | 473.0 gms |
| Dimethylaminoethanol | 1.6 gms |
| Epoxy polymer solution (prepared above) | 1039.0 gms |
| Dimethylaminoethanol | 56.3 gms |
| TOTAL | 1569.9 gms |

The acrylic polymer solution, the epoxy polymer solution and the 1.6 gms dimethylaminoethanol are charged to a reactor equipped with a stirrer, condenser, thermometer and a nitrogen inlet. The nitrogen flow is started and the batch is heated to 117° C. The batch is held at 117° C. for five hours and the acid and oxirane levels are measured. The acid number is 67 and the oxirane level is less than 0.01 meq/gm. 56.3 gms dimethylaminoethanol are added to partially neutralize the polymer acidity, stirred until uniform and cooled to room temperature. The resulting epoxy acrylate polymer solution has a solids content of 65%. The polymer has the composition epoxy/acrylic-70/30 and is characterized by an acid number of 66.8 and an oxirane value of 0.

A water dispersion of the above produced epoxy acrylate polymer solution is prepared as follows:

| | Parts by weight |
|---|---|
| Partially neutralized epoxy acrylate polymer solution (prepared above) | 300.0 gms |
| Demineralized water | 300.0 gms |
| TOTAL | 600.0 gms |

The epoxy acrylate polymer solution is placed into a dispersion vessel equipped with a stirrer and is heated to 80° C. Agitation is started and the deionized water is added over a 15 minute period. Agitation is continued until all of the polymer is dispersed. The dispersion is cooled to room temperature. The dispersion has a solids content of 32.9% and is characterized by 7.77 pH, 0.29 micron particle size, 1200 centipoise viscosity (Brookfield #1 spindle, 30 RPM) and a water/organic solvent ratio of 71/29 by weight.

The above prepared dispersion is modified with a melamine-formaldehyde resin, Cymel 370 (American Cyanamid Company) at 7% solids on solids level. The resulting mixture is cast on aluminum substrate with a wire-wound bar. The coated panels are baked 75 seconds total time at 400° F. in a forced air oven. The baked films display excellent wetting, clarity and gloss. Other film properties are listed below.

| Methyl ethyl ketone double rubs | 23 |
|---|---|
| Pasteurization adhesion | 10 |
| Pasteurization blush | 10 |
| Wedge bend flexibility | 6+ |

(Rating: 10 + no failure. 0 = Complete failure)

EXAMPLE 2

Into a 3 liter round bottom flask, equipped with reflux condenser, heating mantle, stirrer, thermometer and inert gas blanket were charged 672.8 gms of 2-ethoxyethanol and 913.0 gms of a diglycidyl ether of Bisphenol A having an epoxide equivalent weight of 1.1 meq/g. (Epon 1004 from Shell Chemical Company). After heating to dissolve the epoxy resin, 96.2 gms of octanoic acid was added together with 2.0 gms of tri-n-butylamine. The reaction mixture was heated at 135°–140° C. until the acid value fell below 1.

An acrylic copolymer solution was produced by copolymerizing 75.6 parts of ethyl acrylate with 24.4 parts of methacrylic acid in organic solvent solution in 2-ethoxyethanol. The solution copolymer product had a nonvolatile solids content of 71.8% and the solids had an acid number of 158.

400 gms of the epoxy-octanoic acid ester solution produced above was then reacted at 138° C. with 167.8 gms of the ethyl acrylate-methacrylic acid copolymer solution produced above.

A clear reaction product was obtained with the solids thereof having an acid number of 43.

Ammonia is added to neutralize the copolymer acidity and then hexamethoxymethylmelamine is added (Cymel 300 from American Cyanamid may be used) in an amount of 10 parts per 100 parts or resin solids.

This neutralized copolymer solution is diluted with deionized water to provide an emulsion containing approximately 30% by weight of resin solids and the aqueous composition so obtained is applied to aluminum panels with a wire wound bar to provide a film having a thickness of approximately 0.15 mil. Prior to dilution with water, a small amount (0.5% based on the weight of resin solids) of a curing catalyst is added (Alipal CO-436 supplied by General Aniline). The aminoplast cure and its catalysis are conventional. The coated panels were cured by placing them in an oven maintained at 408° F. for 75 seconds.

The following characteristics are obtained.

| | |
|---|---|
| Methyl ethyl ketone double rubs (to remove coating) | 42 |
| Wedge bend flexibility | 4 |
| Pasteurization adhesion and blush resistance | 10 |

(Rating scale: 10 = No failure; 0 = Complete failure)

COMPARISON EXAMPLE A

An epoxy acrylate copolymer solution is prepared just as in Example 1 except that benzoic acid is omitted in the preparation of the partially defunctionalized epoxy resin. When this epoxy resin solution is reacted with the acrylic polymer gelation occurs.

COMPARISON EXAMPLE B

In a similar manner to Comparison Example A, Example 2 is repeated except that the step of reacting the epoxy with octanoic acid was omitted. When the epoxy is reacted with the acrylic polymer gelation occurs.

What is claimed is:

1. A composition suitable for sanitary can coatings consisting essentially of a self-emulsified mixture substantially free of oxirane groups including a hydroxy ester copolymer containing carboxyl groups at least some of which, sufficient to achieve self-emulsification in water, are neutralized by volatile amine; which composition is the product of the reaction of:
   (a) an acidic addition copolymer having an acid number greater than 150 comprising a copolymer of monoethylenically unsaturated monomers selected from the group consisting of thyrene, vinyl toluene, acrylic acid esters, methacrylic acid esters, acrylic acid and methacrylic, acid containing at least about 30% by weight of acrylic or methacrylic acid based on the total weight of monomers; and
   (b) a mixture containing (bisphenol-A)-epichlorohydrin polyether epoxy resin including at least 5% by weight of polyether epoxy resin containing oxirane groups and at least 25% by weight of said (bisphenol-A)polyether being terminated with bisphenol-A and devoid of oxirane groups, said mixture comprising at least 40% of the total resin solids and containing sufficient oxirane groups to provide a ratio of oxirane groups to carboxyl groups of 1:2 to 1:20;

conducted in the presence of a tertiary amine in amounts from 0.1% to 0.3% by weight of reactants subject to esterification;

said composition having at least a portion of the carboxyl groups in said hydroxy ester copolymer reacted with base to render the composition self-emulsifiable in water, and said composition emulsified in water in the substantial absence of added emulsifying agents.

2. The composition in claim 1 in which said ethylenic carboxylic acid is present in an amount between 30% and 80% based on the total weight of the monomers.

3. The composition in claim 1 in which both said aromatic polyethers have an average molecular weight of at least 1500.

4. The composition of claim 1 in which said aromatic polyethers include at least 3% by weight of aromatic polyether carrying two glycidyl ether groups.

5. The composition of claim 1 in which said aromatic polyethers include at least 10% by weight of aromatic polyether devoid of oxirane functionality.

6. The composition of claim 1 in which said aromatic polyethers are terminated by either glycidyl ether groups or bisphenol groups.

7. The composition of claim 1 which further contains from 1–25% of a curing agent selected from aminoplast resins, phenoplast resins, and mixtures thereof, based on the weight of the total resin content.

8. The composition of claim 1 in which an aminoplast resin is present in an amount of from 2–12%, based on the total weight of resin.

9. A stable aqueous emulsion comprising the composition of claim 1 in which amine is used to form a salt with from 50% to 90% of the available carboxyl groups, and water is present in an amount to provide a solids content of about 15% to 40%.

* * * * *